Sept. 30, 1941.  S. EVANS ET AL  2,257,335

TOOL JOINT WELDING

Filed April 5, 1940

Seth Evans
Richard S. Grant
INVENTOR

BY [signature]

ATTORNEY

Patented Sept. 30, 1941

2,257,335

UNITED STATES PATENT OFFICE 2,257,335

TOOL JOINT WELDING

Seth Evans and Richard S. Grant, Houston, Tex., assignors to Hughes Tool Company, Houston, Tex., a corporation of Delaware Application April 5, 1940, Serial No. 328,001

5 Claims. (Cl. 113—112)

The invention relates to the welding of tool joints to drill pipe. It pertains particularly to the construction of the pipe and the joint thereto so that the welding operation may be performed with a minimum of cost in time and labor.

It is an object of the invention to form the weld along the elevator shoulder on the pipe where the wall is thickened so as to provide a weld area no weaker than is the pipe itself.

We desire to perform the welded connection between the pipe and joint at a point where it will be as strong as is the body of the drill pipe and thus form no weak point where fracture might develop.

It is also an object to form the weld between the pipe and the joint at a point which makes it possible to attach new joints to the pipe and still provide a strong area of attachment at the weld. Thus, when a joint member becomes so worn that it is unserviceable, it may be cut off and a new joint employed to replace the old worn one, making the weld at an advantageous point where the walls are of suitable thickness.

Figure 1:
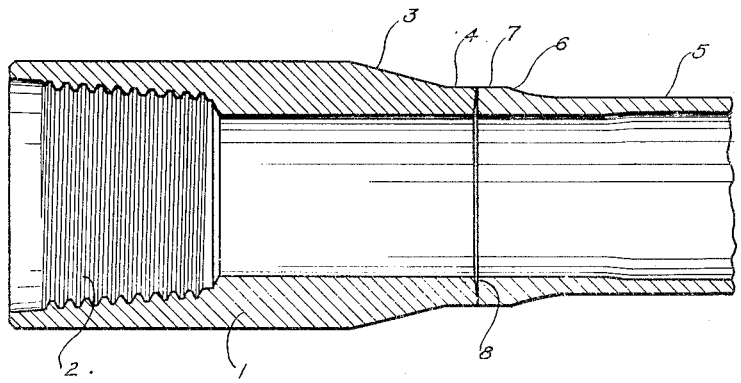

The invention will be more clearly understood from a consideration of the drawing herewith wherein Fig. 1 is a longitudinal section through a tool joint and the end of a pipe section arranged preparatory to welding.

Figure 2:
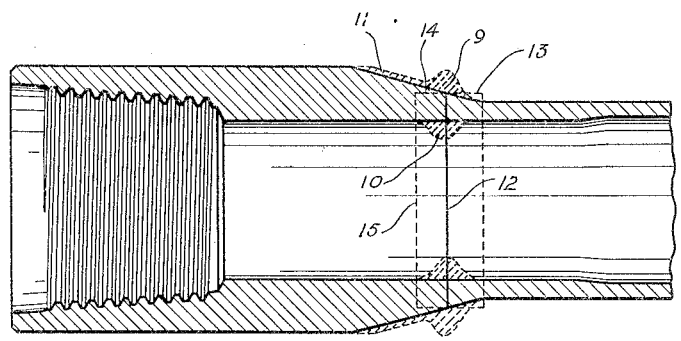

Fig. 2 is a similar view after the weld has been performed.

The tool joint member may be either a box or pin member. We have shown a box member 1 having a tapered and threaded socket or box 2 to connect with the pin upon an adjacent pipe section. The walls of the joint member are comparatively thick but the outer periphery is tapered at 3 and a cylindrical area 4 is formed adjacent the end for use in the welding operation. The tapered area 3 furnishes a shoulder for engagement by the elevators in use.

The drill pipe section 5 may be about thirty feet long. At the end adjacent the weld the wall is upset at 6 to form a short cylindrical area 7 of the same wall thickness as is the joint at 4. For purpose of a flash weld the end of the joint member may be beveled slightly outwardly at 8 so that contact as the arc is initiated will be only along the outer margin at the end.

The weld is made by any preferred method of flash welding. It will be understood that electric potential between the adjacent ends of the joint and pipe will be generated and an arc formed between the meeting ends. As the metal heats up the ends of the pipe and joint along the cylindrical areas 4 and 7 will be burned away as the joint is moved toward the pipe and, when the metal is sufficiently plastic, the ends will be forced together to form the weld. The metals of the pipe and the joint will be displaced as shown in dotted lines at 9 and 10 in Fig. 2.

The operator then removes, by means of a cutter or otherwise, the upset metal and also machines away the joint shoulder at 11 to form a smooth area to be engaged by the elevator.

It is to be observed that the weld line 12 is at a point where the wall thickness is greater than is that of the pipe 5. It will therefore be as strong at the weld as it will be along the pipe and breaking at the weld will not occur because of any greater weakness at that point.

The dotted lines in Fig. 2 at 13 indicate the end of the joint before welding, and the lines 14 show the end of the pipe before the end was burned away in welding.

In the use of the drill stem in operation the wear due to contact of the drill stem with the casing or the wall of the hole is greatest upon the outer surface of the joints and they will finally become so worn that they become unduly weak and there is not sufficient shoulder to safely support the pipe in the elevators. It then becomes desirable to replace the old joint member with a new one. This is done by severing the old joint along a line indicated by the dotted line 15. The outer periphery may be then machined to the size indicated by the dotted line 16 and the operator will then have a pipe section like that shown in Fig. 1. Thus a new joint member like that shown at 1 may be welded thereto without difficulty.

By forming the weld at the point described it enables the operator to produce a weld along a thickened wall upon the pipe where weakness is not liable to develop. Further if it becomes desirable to remove the joint when worn, the old joint may be cut off at a point along the worn joint which will leave a wall thickness upon the pipe similar to that upon the new pipe section thus enabling a new joint to be welded thereto.

Also forming the weld at this point along the joint economizes in metal. The pipe does not need to have a thick nor a long upset and the cost of the pipe upset is small. On the tool joint also the area to be burned off in welding is comparatively thin.

The advantages of our invention lie in the position of the weld and the structure of the parts adjacent the weld and although we have illustrated the invention as employing the flash type of weld, it is to be understood that other methods of welding may be used without departing from the spirit of the invention.

What we claim as new is:

1. In welding tool joints the steps including forming upon the pipe ends of externally upset areas having a short cylindrical outer surface and a short tapered shoulder, forming the tool joint with comparatively thick walls and with a reduced diameter at the end to be welded so that there is a tapered area and a cylindrical wall on the joint of the same thickness as the pipe end, flash welding the ends of the joint and pipe together to burn off most of the said cylindrical areas of pipe, and joint, and making a weld upon the tapered area formed by the tapered portions of the joint and pipe.

2. In welding a tool joint to a drill pipe, forming the drill pipe with a slight flare on the outer surface thereof at the end, forming the tool joint with a tapered shoulder to engage said pipe end, welding the pipe and joint to bring the tapered area upon the joint and the flaring end of the pipe into contact so that there will be a tapered elevator shoulder partly upon the pipe and partly upon the joint and machining the weld along said shoulder.

3. In combination, a drill pipe section externally upset closely adjacent its ends to provide a relatively greater wall thickness at said ends, a tool joint member of harder steel and greater wall thickness than said pipe ends welded thereto, and a tapered area on said joint member and pipe forming a continuation of the external upset of said pipe, the weld line between said pipe section and said joint being upon said tapered area.

4. A drill pipe having an external upset at the ends thereof flaring outwardly, a tool joint of harder steel than said pipe with its walls thicker than the upset portion of the wall of the pipe and tapered on the end toward the pipe and having an end thickness equal to that of the upset end of the pipe and welded thereto to form a sloping elevator shoulder partly on the joint and partly upon the pipe.

5. A drill stem section, tool joints of harder steel than the pipe, connected thereto by flash welding, the tool joint having a greater external diameter than the pipe, and a sloping shoulder on the outer surface formed partly upon the tool joint and partly upon the pipe end, the weld line being transversely of said shoulder.

SETH EVANS.
RICHARD S. GRANT.